United States Patent [19]

Oxel

[11] 3,866,525

[45] Feb. 18, 1975

[54] TOASTER WITH WARMING RACK
[75] Inventor: Berton R. Oxel, Louisville, Ohio
[73] Assignee: The Hoover Company, North Canton, Ohio
[22] Filed: Mar. 1, 1973
[21] Appl. No.: 337,096

[52] U.S. Cl. ........................ 99/357, 99/339, 99/385
[51] Int. Cl. ............................................ A47j 37/08
[58] Field of Search ............ 99/339, 340, 357, 393, 99/385

[56] References Cited
UNITED STATES PATENTS
2,640,600  6/1953  Farr ...................................... 99/339
FOREIGN PATENTS OR APPLICATIONS
1,245,067  9/1971  Great Britain....................... 99/385

Primary Examiner—Harvey C. Hornsby
Assistant Examiner—Robert Pous

[57] ABSTRACT

An appliance having a housing with an internal toasting chamber and an upwardly directed access opening into such chamber. Carried by and disposed above the housing is a rack which is vertically movable between two spaced positions to provide a selectively usable support for an article to be warmed by heat generated within the toasting chamber. The rack has an opening in register with the housing opening to provide for unobstructed access to the toasting chamber. Also provided are means for yieldably retaining the rack in a position elevated above the housing, means to prevent tilting of the rack during vertical movement thereof, and handle means carried by the rack to provide for manual shifting movement thereof.

6 Claims, 4 Drawing Figures

PATENTED FEB 18 1975 3,866,525

TOASTER WITH WARMING RACK

SUMMARY OF THE INVENTION

The present invention relates to toasters, more particularly to toasters of the type having an internal toasting chamber to which access is provided for insertion and removal of bread slices or other food articles through an upwardly directed opening, and the principal object of the invention is to provide a new and improved toaster with a novel function which in no way impairs conventional toaster functions.

In brief, the present invention provides a toaster having a rack which is shiftable from a position resting upon the top of the usual toaster housing to a position spaced above the housing. Novel latch means are provided for yieldably retaining the rack in its elevated position in which it is adapted to support articles which are to be warmed by heat generated within the toasting chamber and escaping through the upwardly directed housing opening. Means are provided within the housing to insure against tilting of the rack during movement thereof, such means comprising an equalizing device which insures unitary movement of opposite ends of the rack.

With the rack disposed in its lower position in which it rests upon the top of the toaster housing, the toaster may be used conventionally, access to the toasting chamber being provided by an opening in the rack in registry with the upwardly directed housing opening. To facilitate movement of the rack between its two positions, the latter is provided with a suitable handle, preferably of the type which provides a thermal barrier since during use of the toaster the rack will become rather warm.

These and other features will readily become apparent from a study of the following description and from the drawings appended hereto, and in these drawings:

DRAWING DESCRIPTION

DETAILED DESCRIPTION

Figure 1:
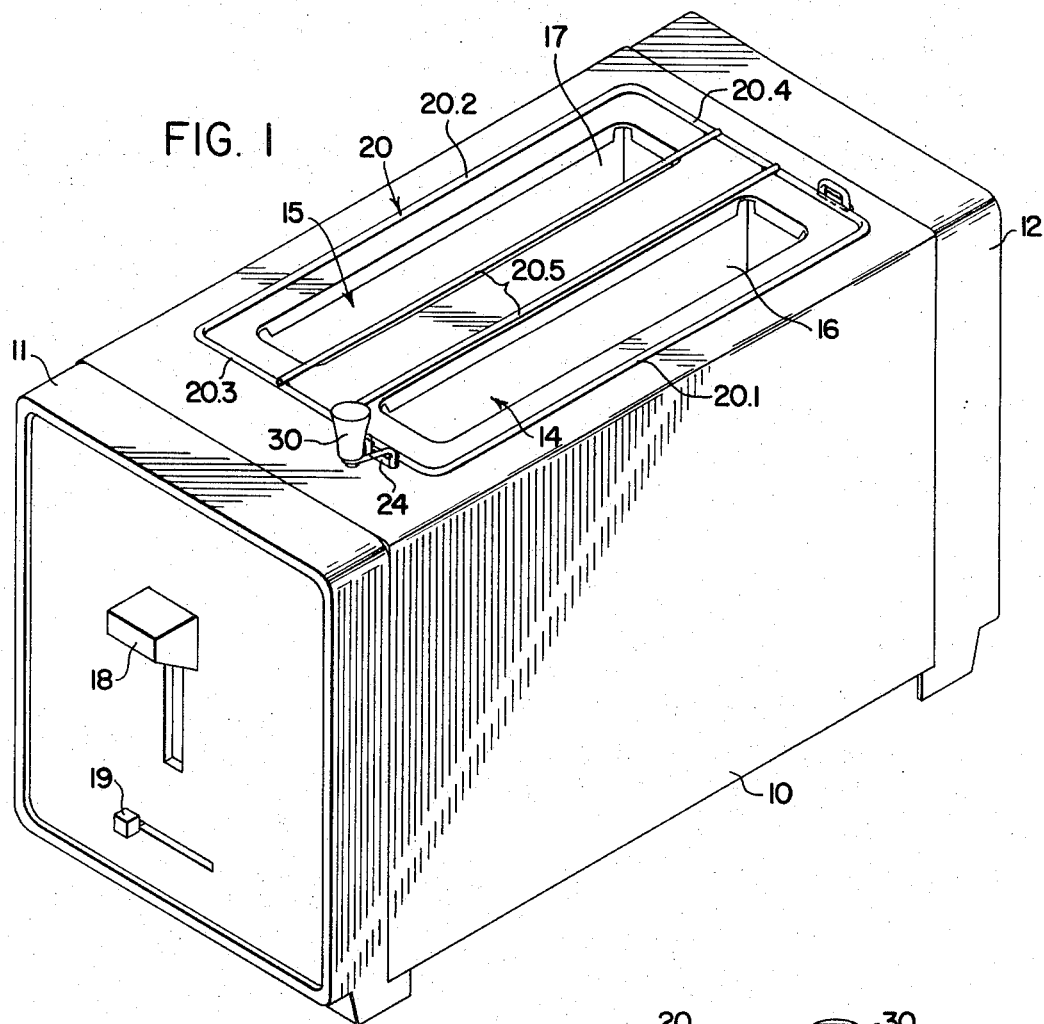
FIG. 1 is a perspective view of a toaster which embodies a preferred form of the present invention.

With reference first to FIG. 1, there is shown a side-by-side, two-slice, pop-up toaster of any conventional design. Such toaster is herein disclosed as having an outer casing or housing 10 with front and rear end panels 11 and 12. Within the outer housing is an inner housing 13 (see FIGS. 3 and 4) which provides spaced, side-by-side toasting chambers 14 and 15. Such housings are provided with elongated, upwardly directed, registering openings 16 and 17 through which slices of bread or other articles to be toasted may be inserted into and removed from the toasting chambers. Although not shown, radiant heating elements, preferably of the electric resistance type, are disposed on opposite sides of both toasting chambers so that a bread slice within a chamber may be subjected to and toasted by radiant heat.

Vertically movable within the toasting chambers will be the usual support carriage on which the articles to be toasted rest. A handle 18 may be carried by the carriage and projects through a vertical slot in the front end panel 11 to provide for manual lowering and raising of the carriage (and thus the articles supported thereon) to and from toasting position in which the articles are wholly within the toasting chambers.

The usual timing mechanism may be disposed within the toaster housing 10 adjacent the end panel 11, such mechanism functioning to terminate a toasting cycle after a period of time calculated to provide the desired degree of toasting. Such mechanism may have a manual adjustment 19 to provide for variation of the time cycle in accordance with the user's preference in the degree of toasting desired.

In brief, operation of the conventional electric toaster above described will be as follows: With adjustment 19 positioned as desired, and, of course, with the usual power cord connected to a proper source of electrical energy, bread slices will be inserted through the housing openings 16 and 17 to rest upon the previously mentioned carriage. Since the carriage is in its uppermost position, the bread slices will project well above the upper surface of the outer housing 10. The handle 18 will now be depressed to lower the carriage and consequently lower the supported bread slices to positions wholly within respective toasting chambers.

When the carriage is fully lowered, the usual latch mechanism will retain it in such position and at the same time, the radiant heating elements which define the toasting chambers will be energized through the usual switch which is responsive to lowering of the carriage. After a suitable time interval, the usual timing mechanism will release the carriage for spring return to its uppermost position wherein the toast projects sufficiently above the upper surface of the housing 10 that it may easily be removed by the user. Upon elevation of the carriage, the radiant heating elements will be de-energized and, after the toast is removed, another cycle of operation may be repeated if more toast is required.

During a cycle of operation of the toaster as above described, considerable heat escapes from the toasting chambers through the housing openings, 16, 17 and it is an object of the present invention to utilize such escaping heat to warm food articles which are of such size that they cannot fit through the housing openings, which are merely to be warmed slightly without toasting or which, by their nature, should never be inserted into the chambers. An example of food which will not fit into a toasting chamber and which is desirably warmed without toasting may be a biscuit or bun. An example of food which should not be inserted into the toasting chamber is a coated or filled food product, such as a sweet roll, whose coating or filling might escape into the toasting chamber to perhaps damage the toaster mechanism or even create a smoke or fire hazard.

With reference to FIG. 1, a rack 20, preferably formed of a relatively rigid metal wire, overlies the toaster outer housing 10. As herein shown, the rack is in the form of a rectangle with side portions 20.1 and 20.2 and end portions 20.3 and 20.4, all spaced slightly outboard the pair of housing openings 16 and 17. Intermediate rack portions 20.5 extend between the end portions 20.3, 20.4 and are structurally integral therewith, such intermediate portions also being to one side of the openings 16, 17 for a purpose to appear.

Figure 2:
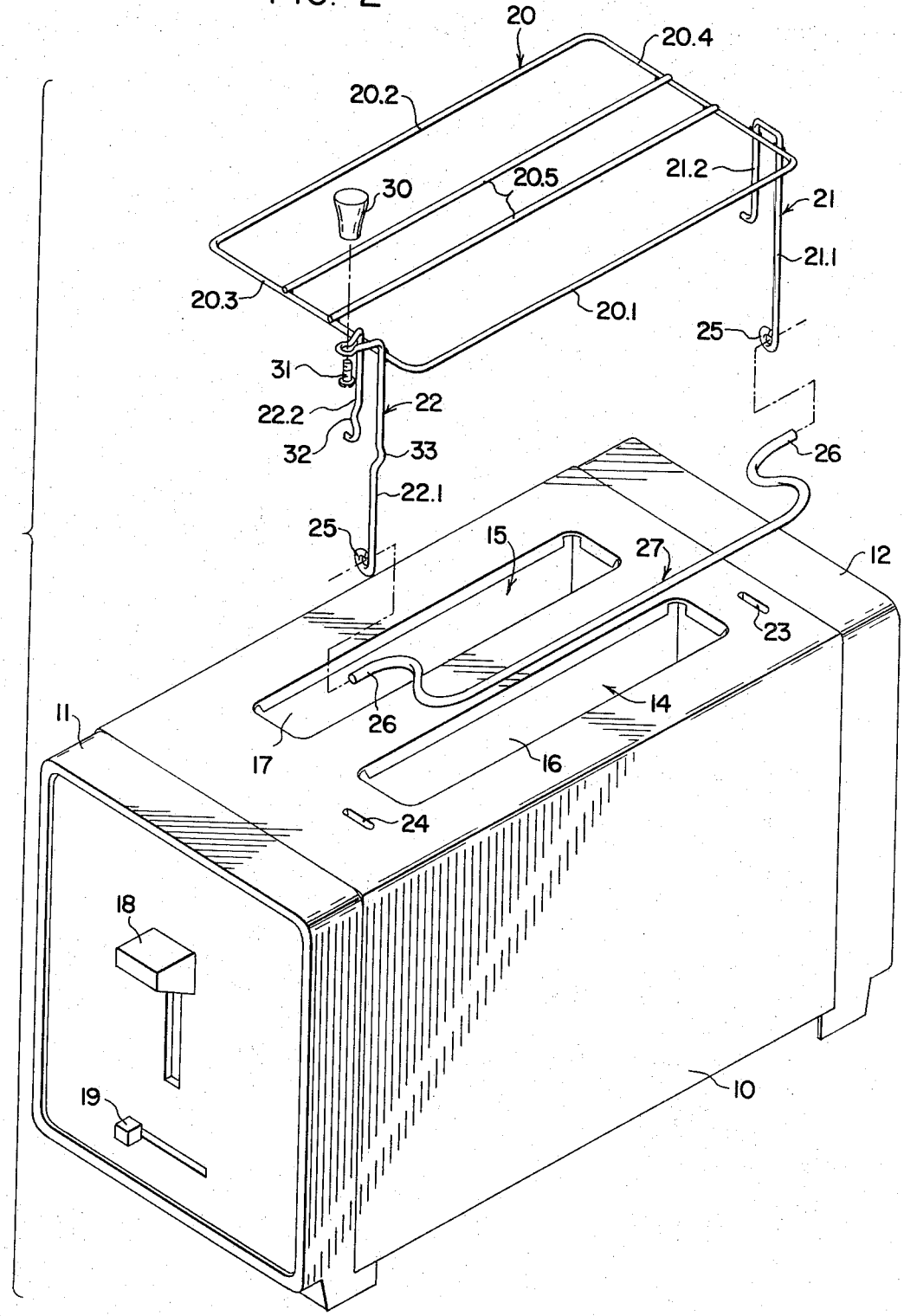
FIG. 2 is an exploded perspective view of the invention.

As best seen in FIG. 2, rack 20 has depending legs 21, 22 preferably formed of wire and welded to the rack end portions 20.3, 20.4 respectively. Leg 21 is formed of a pair of portions 21.1 and 21.2 spaced apart from side-to-side of the rack while leg 22 is similarly formed of a pair of spaced-apart portions 22.1, 22.2. As herein shown, legs 21, 22 are positioned generally in alignment with the outer housing opening 16 and are adapted to slidably pass through respective slots 23, 24 formed in the outer housing 10. For a purpose to appear, at least leg portions 22.2 of leg 22 is resilient.

The lower ends of leg portions 21.1 and 22.1 are formed to provide loops 25 which closely receive respective crank ends 26 of an equalizing member 27 which is journaled in brackets 28 (see FIGS. 3 and 4) formed on the toaster inner housing 13. The purpose of equalizing member 27 is to insure that the ends of rack 20 move in unison as the rack is shifted between the positions seen in FIGS. 3 and 4.

One of the rack legs 21, 22, and preferably the leg 22, has an elongated upper portion 29 bent outwardly to form a support for a low heat conductive handle 30 which may conveniently be secured to the leg by means of a screw 31.

Figure 4:
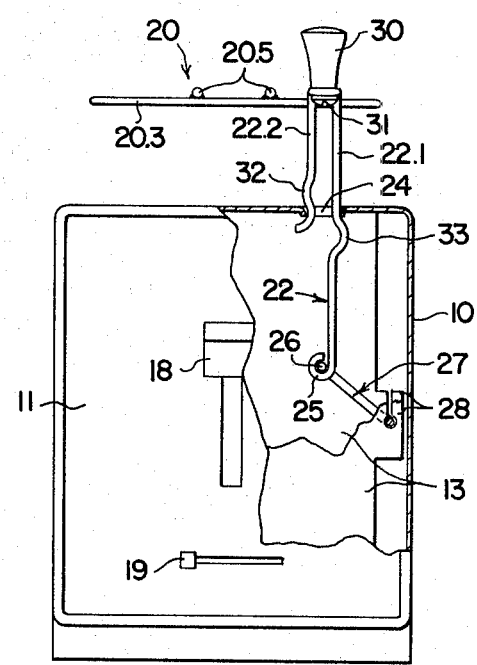
FIG. 4 is a view similar to FIG. 3 but with certain parts in another position.

Latch means are provided for resiliently retaining the rack 20 in its elevated position seen in FIG. 4 and in the preferred embodiment, rack leg portion 22.2 is formed to provide a cam 32 while the leg portion 22.1 is formed to provide an abutment 33. As best seen in FIG. 4, elevation of the rack to the position illustrated will spring the leg portion 22.2 to the right (in the position of parts shown) to permit the cam 32 to pass through the housing slot 24. Upon passage of the cam 32, the leg portion 22.2 will spring back thus causing the cam to rest upon the adjacent portion of the outer housing defining the slot 24 to retain the rack in its elevated position. With the rack thus elevated, the abutment 33 will bear against the underside of the outer housing 10 to limit further upward movement of the rack. Such abutment also serves the purpose of preventing tilting of the elevated rack in a counterclockwise direction as viewed in FIG. 4.

Figure 3:
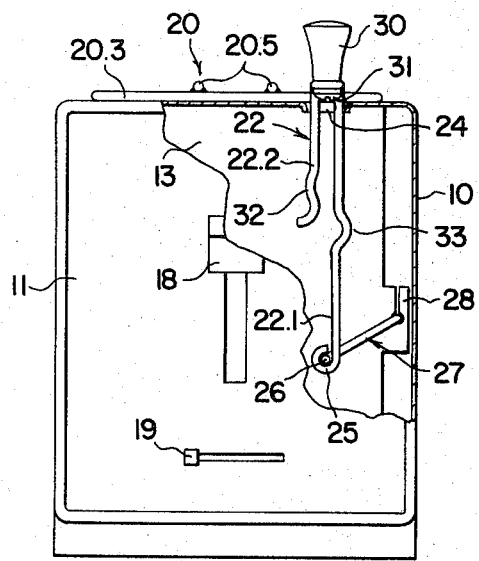
FIG. 3 is an enlarged, and elevational view with parts on the near side broken away to show the underlying structure.

When the rack 20 is to be lowered from the position seen in FIG. 4 to the position seen in FIG. 3, a downward force will be exerted on the rack handle 30 to spring the leg portion 22.2 sufficiently to allow the cam 32 to descend through the housing slot 24.

While the leg portions 21.1, 21.2 of leg 21 are shown devoid of the abutment and cam associated with leg 22, it will be understood that leg 21 may, if desired, be provided with an abutment and cam in alignment with and similar to those provided by the leg 22. Such abutment and cam, of course, would cooperate with the outer housing 10 adjacent the housing slot 23 in the same manner as previously described with respect to the abutment and cam of leg 22.

During operation of the toaster structure hereinbefore described, it is to be understood that FIGS. 1 and 3 illustrate a non-use position of rack 20 in which it rests upon the upper surface of the outer housing 10. In such position, the rack in no way interferes with insertion of bread slices or other food articles into the toasting chambers through the openings 16, 17. Similarly, at the termination of a toasting cycle when the toast is partially elevated from the toasting chamber to project through the openings 16, 17 in the usual manner, the rack will in no way interfere with removal of the toast from the toaster.

In the elevated, normal use position of the rack 20 as seen in FIG. 4, articles to be warmed will be placed upon the rack and the toaster operated through one or more cycles. As the toaster operates through a cycle, heat generated within the toasting chambers escapes through the openings 16, 17 and warms the overlying, rack-supported articles.

In view of the foregoing, it will be apparent to those skilled in the art that I have accomplished at least the principal object of my invention and it will also be apparent to those skilled in the art that the embodiment herein described may be variously changed and modified without departing from the spirit of the invention, and that invention is capable of uses and has advantages not herein specifically described, hence it will be appreciated that the herein-disclosed embodiment is illustrative only and that my invention is not limited thereto.

I claim:

1. In apparatus for toasting bread slices and the like having a housing enclosing a toasting chamber and an upwardly directed, elongated housing opening through which a bread slice may be inserted into and removed from said toasting chamber, the improvement comprising a rack disposed above said housing and vertically movable relative thereto between at least two vertically spaced positions and providing a selectively usable support for an article to be warmed by heat generated within said toasting chamber, said rack having an opening therethrough in registry with said housing elongated opening and providing for unobstructed passage of a bread slice to and from said toasting chamber, a pair of legs structurally integral with and depending from said rack and said legs being disposed adjacent respective ends of said housing elongated opening and projecting into said housing, and means within said housing connecting the lower portions of said legs together for simultaneous vertical movement to prevent tilting of said rack in a direction from end to end of said elongated housing opening during movement of said rack between said positions.

2. The construction of claim 1 and further comprising latch means yieldably retaining said rack in an elevated position relative to said housing.

3. The construction of claim 2 and further comprising handle means carried by said rack to provide for manual shifting movement aforesaid of said rack.

4. In apparatus for toasting bread slices and the like having a housing enclosing a toasting chamber and an upwardly directed, elongated housing opening through which a bread slice may be inserted into and removed from said toasting chamber, the improvement comprising;

a rack disposed above said housing and vertically movable relative thereto between at least two vertically spaced positions and providing a selectively usable support for an article to be warmed by heat generated within said toasting chamber, said rack having an opening therethrough in registry with said housing elongated opening and providing for unobstructed passage of a bread slice to and from said toasting chamber, a pair of legs structurally integral with and depending from said rack, said legs being disposed adjacent to but longitudinally spaced from respective ends of said housing elongated opening and said legs projecting into said housing through respective apertures formed therein, and a cam carried by one of said legs and resiliently engageable with the defining margin of the housing aperture through which said one leg projects to yieldably retain said rack in an elevated position above said housing, said legs being formed of a pair of leg portions, one of which provides said cam and said leg portions being in side-by-side relation and spaced apart in a direction transversely of said elongated bread slice-receiving housing opening and said one leg portion being resilient to yieldably bias said cam to engagement with the defining margin of the housing aperture associated with such one leg portion, said cam being disposed exteriorly of said housing when said rack is in its elevated position to yieldably retain said rack in such position and said cam being disposed interiorly of said housing when said rack is in a lower position relative to said housing, the other portion of said one leg having an abutment within said housing and engageable therewith when said rack is in its elevated position to limit further upward movement of said rack relative to said housing.

5. The construction of claim 4 wherein said apparatus has a pair of upwardly directed, elongated housing openings in spaced, side-by-side relation through which respective bread slices may be inserted into and removed from respective toasting chambers, wherein said rack has an opening associated with each of said elongated housing openings for the purpose aforesaid, wherein said pair of legs are generally aligned with one of said elongated housing openings thereby resulting in asymetric support for said rack, and wherein the leg portion abutment aforesaid is provided by that leg portion furthest from said other elongated housing opening to resist tilting of said rack in its elevated position.

6. The construction of claim 5 and further comprising means within said housing connecting the lower portions of said legs together for simultaneous vertical movement to prevent tilting of said rack in a direction from end to end of said elongated housing openings during movement of said rack between said vertically spaced positions.

* * * * *